United States Patent Office 2,933,395
Patented Apr. 19, 1960

2,933,395

PROCESS FOR PREPARING A DECAFFEINATED SOLUBLE COFFEE EXTRACT

Irwin L. Adler, Jersey City, N.J., and Ernest L. Earle, Jr., West Nyack, N.Y., assignors to General Foods Corporation, White Plains, N.Y., a corporation of Delaware No Drawing. Application December 12, 1956
Serial No. 627,754

7 Claims. (Cl. 99—71)

This invention relates to the production of an improved decaffeinated soluble coffee extract.

In the production of a decaffeinated soluble coffee product from the aqueous extract of ground roasted coffee it is generally found that the beverage quality of the extract is inferior. This is true whether the extract is dried to a so-called "instant" powder or is left in the form of a liquid concentrate. It appears that any caffeine solvent employed in decaffeinating a roasted coffee extract is also capable of extracting constituents which enhance cup coffee flavor and aroma. During such a decaffeination process elevated temperatures are usually required for efficiency in the rate of caffeine extraction and achieving a low final level of caffeine in the coffee solids of the extract. These elevated temperatures, in addition to impairing quality of coffee solids, apparently increase the efficiency of the solvent for dissolving desirable constituents in the coffee solids other than caffeine. Consequently, mild temperatures and caffeine extraction conditions must be employed resulting in increased capital investment and operating expense. Furthermore, such careful processing is not rewarded by any substantial improvement in beverage quality.

For these reasons the decaffeinated soluble coffee heretofore produced commercially has been derived by decaffeinating green coffee, roasting the decaffeinated green coffee and then producing the aqueous coffee extract. It would be desirable to have a commercially feasible process which permits decaffeination of part of the aqueous extract of roasted coffee produced for sale as nondecaffeinated extract. This process should be relatively simple and capable of efficiently reducing the caffeine to a low level while offering good cup coffee.

One approach to solving the quality problem encountered in decaffeinating a roasted coffee extract would be to distill desirable volatile constituents including those that are soluble in a caffeine solvent from the extract prior to decaffeination. Although such an approach offers the theoretical advantage of avoiding loss of coffee principles in the caffeine solvent, there are additional difficulties introduced in the decaffeination procedure which stem from such distillation. It appears that in the step of recovering desired aroma and flavor constituents from the extract through evaporation, coffee constituents in the residue are denatured or otherwise modified to a state where they interfere with a later decaffeination operation through precipitation of solids. In addition the flavor of the soluble coffee solids in the distilland is modified to the extent that it loses some of its resemblance to coffee.

The problem of solids precipitation in a decaffeination operation such as the liquid-liquid extraction of caffeine by means of a water-immiscible organic caffeine solvent, such as methylene chloride, is particularly grave. Precipitation of solids in an elongated extraction column plugs the spray nozzle for atomizing the extract into the solvent. This contributes in large measure to the creation of an emulsion of solvent and coffee extract which is difficult to control. In the liquid-liquid extraction of caffeine by a vertical elongated body of caffeine solvent, it would be the practice to spray the caffeine-bearing extract into one end of the extraction column and to recover the extract at the other end of the column containing the caffeine solvent. An interface exists between the point of input and drawoff of coffee extract. The emulsion of solvent and extract manifests itself between this interface and the point of drawoff and interferes with the drawoff of a single-phase decaffeinated extract in which the solvent would occur substantially only at its maximum solubility in the extract. As a result there is usually required a prolonged period of standing and phase separation so that the emulsion can break and the extract or solvent can be skimmed away. Even after prolonged standing the emulsion is usually not completely broken so that the solvent phase is not completely separated from the extract. Consequently, in later solvent stripping operations a considerable quantity of the caffeine in the emulsion is returned to the extract. Also during this prolonged standing period the solvent has the opportunity of dissolving coffee constituents in addition to the caffeine from the extract and these constituents are therefor lost in separating the solvent.

A process has now been found which permits decaffeination of an aqueous extract of ground roasted coffee without the aforementioned difficulties and which results in a soluble coffee product of high beverage quality. In accordance with this invention the roasted coffee extract is caused to flow in the form of a thin film which is subjected to temperatures and pressures sufficient to evaporate and thereby strip volatile flavor and aroma constituents therefrom. The bottoms or distilland resulting from this stripping operation does not contain precipitated solids so that in the ensuing decaffeination operation no serious nozzle plugging or emulsion formation problems arise, although a slight emulsion may occur. In the decaffeination operation caffeine is removed from the stripped extract by contacting it with a water-immisible organic solvent for caffeine until substantial quantities of the caffeine have been removed. The decaffeinated stripped extract is then separated from the caffeine laden solvent, the residual solvent in the decaffeinated extract is removed, and the volatile flavor and aroma constituents collected are incorporated into the decaffeinated extract to produce the soluble decaffeinated coffee.

Preferably the extract is stripped of its volatile flavor and aroma constituents and concentrated by evaporating the volatiles from an agitated film of the extract. Such films are most conveniently provided in the form of a falling film circumferentially distributed about the heated inner surface of a cylindrical evaporating chamber with the agitation of the film being provided by means of radial vanes on a high speed rotor within the evaporating chamber. The evaporation should be carried out under reduced pressure to permit the use of the lowest possible temperatures for evaporation and reduce the time interval required for stripping to a minium.

The process of this invention is characterized by such ease in decaffeination that the complex solvent separation techniques alluded to hereinabove are unnecessary. This is because the present process enables spraying the aqueous extract under high pressure through a nozzle into a column of extract without developing a troublesome emulsion of solvent and extract. The atomization pressure which may be practiced is subtantially higher than that which can be tolerated in attempting to decaffeinate a roasted coffee extract which has been stripped of volatile constituents and concentrated by any other means.

The process is further characterized by offering the opportunity to employ generally a lower ratio of caffeine solvent to extract. Caffeine extraction efficiency is so improved that it is possible to readily decaffeinate the extract by a single pass through a caffeine solvent such as methylene chloride; in this connection methylene chloride suffices to extract at least 97% of the caffeine in the extract as measured by the standard A.O.A.C. procedure. Other organic water-immiscible caffeine solvents such as benzene, a chlorinated hydrocarbon such as dichloroethylene or trichloroethylene or ethylene chloride or other commercially available solvents can be used to like advantage. Caffeine extraction efficiency is such that relatively mild solvent temperatures can be practiced thereby avoiding impairment of the coffee-like character of the stripped extract. The efficiency offered in spray column extraction of the stripped coffee extract enables a high percentage of caffeine removal under a wide range of extract concentrations, solvent to extract ratios and absolute rates of processing extract through solvent.

In the preferred process an aqueous coffee extract is prepared from roasted and ground coffee beans which can vary in soluble coffee solids concentration from 20%–35%. This extract is introduced to an evaporator which causes it to flow over the evaporating surface in the form of an agitated thin film while being preferably subjected to mild elevated temperatures and reduced absolute pressures. The evaporator strips 20%–40% of the coffee extract (by volume) through evaporation from the thin film. The distillate containing desired flavor and aroma constituents as well as moisture is cooled to at least 55° F. and maintained at this temperature or below until it is later reincorporated into the decaffeinated extract. The distillate may be cooled to still lower temperatures such as those created by a brine solution, solid carbon dioxide or liquid nitrogen. The distillate is stored at reduced temperatures so as to retain the volatile flavor and aroma constituents of the original extract. In stripping these constituents from the film-forming evaporator the temperature of the distilland is maintained below 160° F., preferably below 140° F., and at absolute reduced pressures of 1 in. to 5 in. Hg, although further reduced absolute pressures can also be employed, in which instance the film of extract can be efficiently stripped of its volatiles at temperatures of 100° F. and below. In any event, the temperature of the thin film being evaporated should not exceed 160° F. and the period of exposure should not exceed 30 seconds since this will, in additon to impairing flavor of the coffee, produce a solids precipitations problem in later decaffeination leading to an undesirable emulsion of solvent and extract.

The concentrate or stripped extract may be decaffeinated by means of any one of the aforementioned caffeine solvents in a batch operation but preferably decaffeination is achieved by a continuous process involving liquid-liquid extraction of caffeine in an elongated vertical column of solvent. Liquid-liquid extraction techniques are well known and generally involve continuous feeding of extract into a column of caffeine solvent having a specific gravity different from that of the aqueous extract. When the extract has a lower specific gravity than the solvent the extract will be introduced at the bottom of a column in the form of a fine spray and will collect above the aforesaid interface. When the solvent has a lower specific gravity than the extract the extract will be introduced at the top of the column but the same conditions will be generally observed in the column. In any event, whether the decaffeination operation be continuous or batch-wise, measures should be taken which promote a high degree of distribution of extract as it is introduced to the solvent. Since it is an advantage of this invention that high atomization pressures can be employed without creating a serious emulsion problem, it is desirable to employ the continuous operation offered by liquid-liquid extraction.

The preferred caffeine solvent is methylene chloride and in a liquid-liquid extraction operation the methylene chloride can be employed at room temperature (70° F.) at a solvent to extract concentration (by volume) of 6:1 and generally between 8:1 and 4:1. This ratio will depend on the concentration of extract, the pressures employed in atomization and the temperature of the solvent. It is characteristic of this invention, however, that lower solvent to extract ratios can be more effectively employed when roasted coffee extracts are stripped of volatile flavor and aroma constituents from a thin film of the extract.

It is preferred, to spray the distilland or bottoms into the lower end of a column of methylene chloride maintained at a temperature of 40°–70° F. The concentrate contains from 30%–45% soluble coffee solids and is sprayed into fine discrete droplets by means of a high pressure nozzle (100–200 lbs./sq. in. gauge), the pressure being dependent upon the solvent employed; with the preferred solvent methylene chloride comparatively high nozzle pressures are used. The extract travels upward countercurrent to the solvent. When employing either trichlorethylene at an average column temperature of 160° F. or methylene chloride at room temperature (70° F.) or below, 97% caffeine removal from the extract in a single pass through a vertical column is achieved.

So effective is the avoidance of any emulsion problem that any residual solvent in the decaffeinated extract can be removed quickly and simply by cycling the decaffeinated extract through a suitable evaporator in the same manner as is employed originally in stripping volatiles from the extract prior to decaffeination. The solvent can be stripped to below 10 p.p.m. at mild temperatures, which avoid flavor degradation of the extract. Thus, the decaffeinated extract can be removed continuously from the top of the decaffeinating column, and collected and sent to an evaporator for removal of residual solvent.

Preferably the solvent is stripped from the decaffeinated extract by passing the extract in the form of a thin film with agitation over a cylinder under reduced absolute pressure, the extract being at an elevated temperature below 160° F. for less than 30 seconds; solvent reduction in the order of less than 10 p.p.m. is achieved at such temperatures by employing absolute pressures in the order of 5 in. to 15 in. Hg. However, the solvent can be stripped by any other means involving low temperatures and short retention times; for example, the extract can be atomized into an evacuated chamber to volatilize the solvent.

After solvent stripping, the decaffeinated and solvent-free extract is recombined with the distillate from the initial stripping operation. The resulting extract has a substantially improved coffee quality equal to or better than the best of beverage quality obtainable in a decaffeinated soluble coffee extract.

It is noteworthy that in stripping the volatiles from the coffee extract prior to decaffeination the concentration of the soluble coffee solids in the extract to be decaffeinated is increased; this concentration is in the order of 30%–45% coffee solids. Despite this comparatively high concentration the extract can be decaffeinated under conditions which heretofore might only have been practiced to decaffeinate an extract having a lower coffee solids concentration. Thus, it is practicable in the present process to employ solvent to extract ratios in the order of 6:1 and lower; it is practical to employ comparatively mild solvent temperatures, e.g., room temperatures for methylene chloride; the concentrated extract can be decaffeinated to a 97% caffeine free product by means of a single column of solvent. As a result the saving in equipment and operating expense is substantial. By reason of the desirable condition of the decaffeinated extract it is possible to achieve further savings by employing rapid and inexpensive solvent stripping techniques to remove trace quantities of the solvent phase; viz, vacuum flash evaporation. The final product obtained after the stripped volatiles are added to the decaffeinated extract is a thoroughly flavorful decaffeinated soluble coffee.

While the present invention has been described with particular reference to specific examples, it is not to be limited thereby, but reference is to be had to the appended claims for a definition of its scope.

What is claimed is:

1. A process for the decaffeination of the aqueous extract of roasted coffee which comprises flowing said extract in the form of a thin film while subjecting it to temperatures and pressures sufficient to evaporate and thereby strip volatile flavor and aroma constituents therefrom, condensing and collecting said constituents, extracting caffeine from the stripped extract by contacting it with a water-immiscible organic solvent for caffeine until substantial quantities of the caffeine have been removed from the extract, separating said decaffeinated extract from the caffeine-laden solvent, and incorporating said collected volatile flavor and aroma constituents into the decaffeinated extract to produce soluble decaffeinated coffee.

2. The process of claim 1 in which the film of extract is subjected to a temperature below 160° F. for a period less than 30 seconds at absolute reduced pressures ranging from 1 in. to 5 in. Hg.

3. The process of claim 2 in which the film of extract is agitated over a heat transferring surface.

4. The process of claim 1 in which the stripped volatile flavor and aroma constituents are maintained at a temperature below 55° F. after evaporation and prior to incorporation into the decaffeinated extract.

5. A process for the decaffeination of the aqueous extract of roasted coffee which comprises flowing said extract in the form of a thin film while subjecting it to temperatures and pressures sufficient to evaporate and thereby strip volatile flavor and aroma constituents therefrom whereby upon subsequent liquid-liquid extraction of caffeine from the extract the decaffeinated extract resulting is in a substantially unemulsified condition having the solvent present substantially only at its maximum solubility in the extract, condensing and collecting said constituents, extracting caffeine from the stripped extract by feeding it into an elongated body of a water-immiscible organic solvent for caffeine having a specified gravity different from that of the extract until substantial quantities of the caffeine have been removed from the extract and incorporating said collected volatile flavor and aroma constituents into the decaffeinated extract to produce soluble decaffeinated coffee.

6. A process for the decaffeination of the aqueous extract of roasted coffee which comprises flowing said extract in the form of a thin film while subjecting it to temperatures and pressures sufficient to evaporate and thereby strip volatile flavor and aroma constituents therefrom whereby upon subsequent liquid-liquid extraction of caffeine from the extract the decaffeinated extract resulting is in a substantially unemulsified condition having the solvent present substantially only at its maximum solubility in the extract, condensing and collecting said constituents, extracting caffeine from the stripped extract by spraying the stripped extract into an elongated body of a water-immiscible organic solvent for caffeine having a specific gravity different from that of the extract until substantial quantities of the caffeine have been removed from the extract, stripping residual solvent from said decaffeinated extract at a temperature below 160° F. for a period of less than 30 seconds, and incorporating said collected volatile flavor and aroma constituents into the decaffeinated extract to produce soluble decaffeinated coffee.

7. A process for the decaffeination of the aqueous extract of roasted coffee which comprises flowing said extract having a water soluble coffee solids concentration of 20%–35% in the form of an agitated thin film over a heat transfer medium while it is subjected to a temperature below 160° F. for a period less than 30 seconds and at an absolute reduced pressure below 5 in. Hg to strip volatile flavor and aroma constituents therefrom, whereby upon subsequent liquid-liquid extraction of caffeine from the extract the decaffeinated extract resulting is in a substantially unemulsified condition having the solvent present substantially only at its maximum solubility in the extract, said constituents being from 20%–40% of the coffee extract by volume, condensing and collecting said constituents and maintaining them at a temperature below 55° F., extracting caffeine from the stripped extract by spraying the stripped extract having a coffee solids concentration of 30%–45% into an elongated body of a water-immiscible organic solvent for caffeine having a specific gravity different from that of the extract until substantial quantities of the caffeine have been removed from the extract, stripping residual solvent from said decaffeinated extract at a temperature below 160° F. for a period of less than 30 seconds, and incorporating said collected volatile flavor and aroma constituents into the decaffeinated extract to produce soluble decaffeinated coffee.

References Cited in the file of this patent

UNITED STATES PATENTS

| | | |
|---|---|---|
| 1,123,827 | Whitaker | Jan. 5, 1915 |
| 2,472,121 | Ornfelt | June 7, 1949 |
| 2,542,119 | Cole | Feb. 20, 1951 |
| 2,563,233 | Gilmont | Aug. 7, 1951 |
| 2,802,739 | Nutting | Aug. 13, 1957 |

FOREIGN PATENTS

| | | |
|---|---|---|
| 397,323 | Great Britain | Aug. 24, 1933 |